United States Patent [19]

Moser

[11] Patent Number: 4,818,815
[45] Date of Patent: Apr. 4, 1989

[54] CATIONIC 1,2,3-THIADIAZOLE-AZO-ANILINE OR TETRAHYDROQUINOLINE COMPOUNDS

[75] Inventor: Peter Moser, Binningen, Switzerland

[73] Assignee: Ciba-Geigy Corporation, Ardsley, N.Y.

[21] Appl. No.: 886,500

[22] Filed: Jul. 17, 1986

[30] Foreign Application Priority Data

Jul. 26, 1985 [CH] Switzerland .................. 3241/85

[51] Int. Cl.$^4$ .................. C09B 29/048; C09B 44/20; C09B 69/06; D06P 1/41
[52] U.S. Cl. .................. 534/607; 534/589; 534/590; 534/610; 534/611; 534/795
[58] Field of Search .............. 534/607, 579, 589, 610, 534/611

[56] References Cited

U.S. PATENT DOCUMENTS

| | | | |
|---|---|---|---|
| 3,148,935 | 9/1964 | Pfitzner et al. .................. | 534/607 X |
| 3,280,100 | 10/1966 | Voltz .................. | 534/607 |
| 3,793,305 | 2/1974 | Balon .................. | 534/579 |
| 4,468,349 | 8/1984 | Linhart et al. .................. | 534/579 |

FOREIGN PATENT DOCUMENTS

| | | | |
|---|---|---|---|
| 556218 | 4/1958 | Canada .................. | 534/607 |
| 2142565 | 3/1973 | Fed. Rep. of Germany ...... | 534/607 |
| 61-107251 | 5/1986 | Japan .................. | 534/607 |
| 858181 | 1/1961 | United Kingdom .................. | 534/607 |
| 972956 | 10/1965 | United Kingdom .................. | 534/607 |

*Primary Examiner*—Floyd D. Higel
*Attorney, Agent, or Firm*—Wenderoth, Lind & Ponack

[57] ABSTRACT

The invention relates to novel 1,2,3-thiadiazole-axo compounds of formula

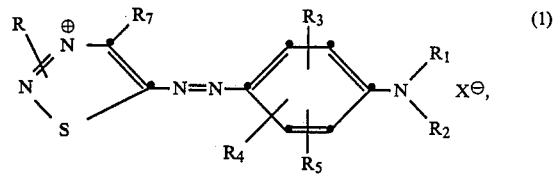

(1)

wherein

R is unsubstituted or substituted alkyl or alkenyl, $R_1$ is hydrogen or unsubstituted or substituted alkyl or alkenyl, $R_2$ is hydrogen or unsubstituted or substituted alkyl, alkenyl, cycloalkyl or phenyl, or $R_1$ and $R_2$, together with the nitrogen atom to which they are attached, are a 5- or 6-membered heterocyclic ring which may contain one or two additional hetero atoms as ring members and/or may be substituted, or $R_1$ together with $R_3$ ortho to the amino group form a partially hydrogenated, unsubstituted or substituted 5-or 6-membered heterocyclic ring which may contain an additional N or O atom as ring member, $R_3$ and $R_4$ are each independently of the other hydrogen, alkyl, alkoxy, alkanoylamino or halogen, $R_5$ is hydrogen or together with $R_4$ in ortho-position forms the member which completes a fused benzene ring, $R_7$ is hydrogen, optionally substituted phenyl or alkyl, and $X\ominus$ is an anion.

These compounds are suitable for dyeing or printing acrylic, acid-modified polyamide and acid-modified polyester fibres in blue shades.

3 Claims, No Drawings

CATIONIC 1,2,3-THIADIAZOLE-AZO-ANILINE OR TETRAHYDROQUINOLINE COMPOUNDS

The present invention relates to novel cationic 1,2,3-thiadiazole-azo compounds, to their preparation and to the use thereof as dyes for dyeing or printing materials which are dyeable with cationic dyes, especially textiles made from polyacrylonitrile, acid-modified polyamide and acid-modified polyester.

The novel cationic 1,2,3-thiadiazole-azo compounds of this invention have the formula

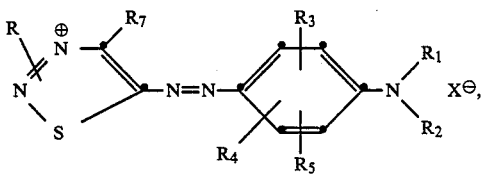

wherein

R is unsubstituted or substituted alkyl or alkenyl, $R_1$ is hydrogen or unsubstituted or substituted alkyl or alkenyl, $R_2$ is hydrogen or unsubstituted or substituted alkyl, alkenyl, cycloalkyl or phenyl, or $R_1$ and $R_2$, together with the nitrogen atom to which they are attached, are a 5- or 6-membered heterocyclic ring which may contain one or two additional hetero atoms as ring members and/or may be substituted, or $R_1$ together with $R_3$ ortho to the amino group forms a partially hydrogenated, unsubstituted or substituted 5- or 6-membered heterocyclic ring which may contain an additional N or O atom as ring member, $R_3$ and $R_4$ are each independently of the other hydrogen, alkyl, alkoxy, alkanoylamino or halogen, $R_5$ is hydrogen or together with $R_4$ in ortho-position forms the member which completes a fused benzene ring, $R_7$ is hydrogen, optionally substituted phenyl or alkyl, and $X^\ominus$ is an anion.

Possible substituents of radicals in the above formula which are defined as being substituted or unsubstituted are preferably nonionic substituents or carboxyl.

Nonionic substituents are in particular the customary non-dissociating substituents of dyestuff chemistry, e.g. cyano, hydroxy, halogen (e.g. fluorine, chlorine, bromine), nitro, alkyl, amino, alkylamino or dialkylamino, phenyl, alkoxy, acyl, acyloxy, alkoxycarbonyl or alkoxycarbonyloxy. Acyl denotes preferably alkylcarbonyl (alkanoyl), unsubstituted or substituted benzoyl (substituents as for phenyl), alkylsulfonyl, phenylsulfonyl, alkylcarbamoyl or dialkylcarbamoyl, benzylcarbamoyl or dialkylsulfamoyl, with alkylcarbonyl (alkanoyl) being most preferred.

Preferred substituents of alkyl radicals R, $R_1$ or $R_2$ are: hydroxy, halogen (e.g. F, Cl, Br), cyano, alkoxy, carboxy, aminocarbonyl, carbalkoxy, acyl, acyloxy (preferred meanings of acyl are those indicated above, especially alkylcarbonyl), phenyl, phenoxy or benzyloxy. The same substituents are also suitable for cycloalkyl radicals, preferably alkyl, alkoxy, halogen or cyano.

Preferred substituents of phenyl radicals $R_2$ are: cyano, hydroxy, halogen (e.g. F, Cl, Br), alkyl, alkoxy, alkoxycarbonyl, carboxyl, carbamoyl, nitro, sulfamoyl, alkylcarbamoyl or benzoylamino. The respective phenyl radicals may carry for example 1 to 3, preferably 1 or 2, of these substituents.

Unless otherwise specified, in the above substituents and throughout the entire remainder of this specification, alkyl by itself or as moiety of composite substituents (e.g. alkoxy, alkoxycarbonyl, dialkylamino and the like) contains preferably 1 to 8, most preferably 1 to 4, carbon atoms. Examples of suitable alkyl groups are methyl, ethyl, n- or isopropyl, n-, sec- or tert-butyl.

Preferred cycloalkyl groups are cyclopentyl and cyclohexyl. Halogen is for example chlorine, bromine or fluorine, with chlorine being preferred. Alkenyl groups contain e.g. 2 to 8, preferably 2 to 5, carbon atoms. Suitable substituents of these groups are for example those indicated for alkyl, but preferably they are unsubstituted.

$R_1$ and $R_2$, together with the nitrogen atom to which they are attached, may be a 5- or 6-membered, preferably saturated, heterocycle. In addition to the N atom, this heterocycle may contain 1 or 2 further hetero atoms, selected in particular from the group consisting of O, N and S, as ring members. Preferably it contains one further hetero atom, in particular N or O. The heterocycle may be substituted, e.g. by alkyl, hydroxyalkyl, cyanoalkyl or alkoxy. Examples of such heterocycles are: pyrrolidine, piperidine, morpholine, thiomorpholine and pyrazolidine, with the first four mentioned heterocycles being preferred.

The member completing a partially hydrogenated heterocyclic ring formed by $R_1$ and $R_3$, together with the nitrogen atom to which they are attached, results in the formation of a 5- or 6-membered heterocycle which is fused to the benzene ring and which contains 1 or 2N atoms or one N atom and one O atom and at least one double bond. Such a heterocycle may also be substituted, for example by a member selected from alkyl, alkoxy, halogen and hydroxy, with alkyl being the preferred substituent. The number of alkyl groups may be 1 to 6, e.g. 1 to 5, most preferably 1 to 4 or 1 to 3. The most preferred alkyl groups are methyl groups.

For example, $R_1$ and $R_3$, together with the nitrogen atom to which they are attached and with the fused benzene ring, form a dihydroindole, tetrahydroquinoline, tetrahydroquinoxaline or tetrahydro-1,4-benzoxazine radical, each of which may be substituted by 1 to 5 $C_1$–$C_4$alkyl groups. The dihydroindole and tetrahydroquinoline radicals are preferred. The nitrogen atom is, of course, substituted by the radical $R_2$.

It will be understood that the invention encompasses all possible tautomeric forms of compounds of formula (1).

The anion $X^\ominus$ is one of the customary and inorganic, preferably colourless, anions of cationic dyes. The anion is normally introduced in the preparatory process (e.g. by the quaternisation) or by the optional purification of the crude compound. However, anions can also be selectively exchanged by conventional methods.

Examples of possible anions $X^\ominus$ are: halide, boron tetrafluoride, thiocyanide, sulfate, alkylsulfate, aminosulfate, chlorate, perchlorate, carbonate, bicarbonate, phosphate, phosphoromolybdate, phosphorotungstate, phosphorotungstomlybdate, benzenesulfonate, chlorobenzensulfonate, naphthalenesulfonate, toluenesulfonate, oxalate, maleate, formate, acetate, propionate, lactate, succinate, chloroacetate, tartrate, methanesulfonate and benzoate ions, and also complex anions, in particular those of chlorozinc double salts, e.g. the tetrachlorozinc anion.

Preferably $X^{\ominus}$ is a halide, methylsulfate, ethylsulfate, phosphate, sulfate, carbonate, benzenesulfonate, toluenesulfonate, 4-chlorobenzenesulfonate, acetate, formate or tetrachlorozinc anion. Most preferably, the compounds of the present invention are obtained as halides (especially chlorides), methosulfates, ethosulfates, sulfates, benzenesulfonates or toluenesulfonates, or as chlorozinc double salts (e.g. tetrachlorozincates).

Preferred compounds of formula (1) are e.g. those wherein R is unsubstituted alkyl or alkyl which is substituted by hydroxy, halogen, cyano, alkoxy, carboxy, aminocarbonyl, alkoxycarbonyl, acyloxy, acyl, phenyl or phenoxy, $R_1$ is hydrogen, alkyl or alkyl which is substituted by hydroxy, halogen, cyano, alkoxy, carboxy, carbamoyl, alkoxycarbonyl, acyloxy, acyl, phenyl or phenoxy, $R_2$ has the meaning of $R_1$ or is phenyl or phenyl which is substituted by cyano, hydroxy, halogen, alkyl or alkoxy, or $R_1$ and $R_2$, together with the nitrogen atom to which they are attached, form a 5- or 6-membered saturated heterocyclic ring which is unsubstituted or substituted by alkyl or hydroxyalkyl and which may contain an additional N or O atom as ring member, or $R_1$ together with $R_3$ in ortho-position to the amino group form a partially hydrogenated 5- or 6-membered ring which is unsubstituted or substituted by alkyl or alkoxy and may which contain an additional N or O atom as ring member, $R_7$ is hydrogen and $R_3$, $R_4$, $R_5$ and $\ominus$ are as defined for formula (1).

Compounds of formula (1) meriting particular interest are those wherein R is $C_1$-$C_4$alkyl or $C_1$-$C_4$alkyl which is substituted by hydroxy, halogen, cyano, phenyl or $C_1$-$C_4$alkoxy, each of $R_1$ and $R_2$ independently of the other is hydrogen, $C_1$-$C_4$alkyl which is unsubstituted or substituted by hydroxy, halogen, cyano, $C_1$-$C_4$alkoxy, carboxy, carbamoyl, phenyl or $C_1$-$C_5$alkoycarbonyl, or $R_1$ and $R_2$, together with the nitrogen atom to which they are attached, form a pyrrolidine, piperidine, morpholine or piperazine ring which is unsubstituted or substituted by $C_1$-$C_4$alkyl or $C_1$-$C_4$hydroxyalkyl, or $R_1$ together with $R_3$ in ortho-position to the amino group and with the fused benzene ring form a dihydroindole, tetrahydroquinoline, tetrahydroquinoxaline or tetrahydro-1,4-benzoxazine ring which is unsubstituted or substituted by $C_1$-$C_4$alkyl, each of $R_3$ and $R_4$ independently of the other is hydrogen, $C_1$-$C_4$alkyl, $C_1$-$C_4$alkoxy or halogen, and $R_5$ is hydrogen, or $R_5$ together with $R_4$ in ortho-position to the amino group form the member necessary to complete a fused benzene ring, and $R_7$ is hydrogen.

Preferred compounds of formula (1) are those wherein at least one, but preferably both, of the radicals $R_1$ and $R_2$ are different from hydrogen.

In all the above mentioned compounds of formula (1), $R_4$ and $R_5$ are preferably hydrogen and $R_3$ is hydrogen, or $R_3$ together with $R_1$ in ortho-position to the amino group and with the fused benzene ring form a dihydroindole or tetrahydroquinoline radical which is unsubstituted or substituted by 1 to 5 $C_1$-$C_4$ alkyl groups, preferably methyl groups. $R_7$ is preferably hydrogen.

Compounds of formula (1) having a particularly interesting utility are those wherein R is $C_1$-$C_4$alkyl, $C_1$-$C_4$hydroxyalkyl or benzyl, each of $R_1$ and $R_2$ independently of the other is $C_1$-$C_4$alkyl, $C_1$-$C_4$hydroxyalkyl, $C_1$-$C_4$alkoxy-$C_1$-$C_4$alkyl, $C_1$-$C_5$cyanoalkyl, $C_1$-$C_4$haloalkyl or benzyl, or $R_1$ and $R_2$, together with the nitrogen atom to which they are attached, form a piperidine, morpholine or piperazine ring, or $R_1$ together with $R_3$ in ortho-position to the amino group and with the benzene ring form a tetrahydroquinoline radical which is unsubstituted or substituted by 1 to 4 $C_1$-$C_4$alkyl groups, preferably methyl groups, $R_3$ is hydrogen or together with $R_1$ forms the tetrahydroquinoline radical as just defined, $R_4$ is hydrogen, $C_1$-$C_4$alkyl, $C_1$-$C_4$alkoxy or halogen, with hydrogen being preferred, and $R_5$ is hydrogen. Among these compounds, those compounds are preferred wherein R is $C_1$-$C_4$alkyl, each of $R_1$ and $R_2$ independently of the other is $C_1$-$C_4$alkyl, or $R_1$ together with $R_3$ in ortho-position to the amino group and with the fused benzene ring form a tetrahydroquinoline ring which is unsubstituted or substituted by 1 to 4 methyl groups, $R_3$ is hydrogen or together with $R_1$ is the tetrahydroquinoline radical as just defined, and each of $R_4$, $R_5$ and $R_7$ is hydrogen.

The novel cationic 1,2,3-thiadiazole-azo compounds of formula (1) can be prepared by methods which are known per se. They are obtained, for example, by diazotising 5-amino-1,2,3-thiadiazole which is unsubstituted or substituted in 4-position by alkyl or by unsubstituted or substituted phenyl, and coupling the diazotised thiadiazole to a coupling component of formula

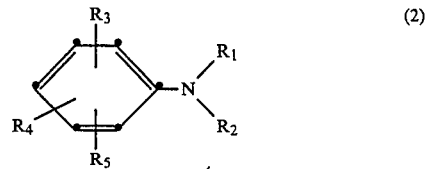

(2)

and quaternising the coupling product with a compound of formula R-X′, in which formulae R to $R_5$ are as defined for formula (1) and X′ is a radical which can be converted into the anion $X^{\ominus}$.

The starting 5-amino-1,2,3-thiadiazole are known or can be prepared by methods which are known per se. 5-Amino-1,2,3-thiadiazole can be prepared as described e.g. in German Offenlegungsschrift No. 2 636 994 in accordance with the following reaction scheme:

$ClCH_2CHO + H_2NNHCOOC_2H_5 \longrightarrow$ $ClCH_2CH=NNHCOOC_2H_5 \xrightarrow{SOCl_2}$

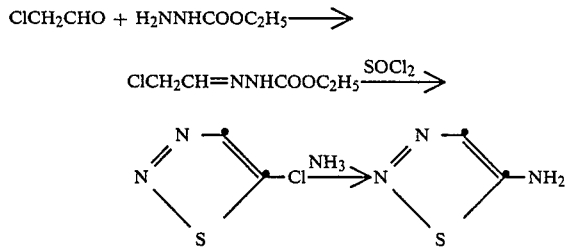

The coupling component of formula (2) are the known coupling components conventionally employed in the chemistry of azo dyes.

The diazotisation of the 5-amino-1,2,3-thiadiazoles is effected in a manner known per se, e.g. with sodium nitrite in acid aqueous medium, the acid employed being e.g. hydrochloric or sulfuric acid. However, the diazotisation can also be carried out with other diazotising agents, e.g. with nitrosylsulfuric acid. During diazotisation an additional acid may be present in the reaction medium, e.g. phosphoric acid, sulfuric acid, acetic acid, hydrochloric acid or a mixture of said acids, e.g. a mixture of phosphoric acid and acetic acid. The diazotisation is conveniently effected in the temperature range from −10° to +30° C., e.g. from −10° to room temperature.

The coupling of the diazotised thiadiazole to the coupling component of formula (2) is also carried out in known manner, e.g. in acid aqueous or aqueous-organic medium, preferably in the temperature range from −10° to +30° C., most preferably at below +10° C. The acid employed is suitably e.g. hydrochloric acid, acetic acid, sulfuric acid or phosphoric acid. Diazotisation and coupling can be carried out for example utilising a single reaction vessel for both steps without isolation of the intermediateε, i.e. in the same reaction medium.

The quaternisation is conveniently carried out in an inert organic solvent, e.g. in a hydrocarbon, chlorinated hydrocarbon or nitrateted hydrocarbon such as benzene, toluene, xylene, tetrachloroethane, chloroform, carbon tetrachloride, monochlorobenzene, dichlorobenzene or nitrobenzene, in an acid amide or acid anhydride such as dimethylformamide, N-methylacetamide or acetic anhydride, in dimethylsulfoxide, or in a ketone such as acetone or methyl ethyl ketone. An excess of the alkylating agent may also be used instead of an organic solvent. The quaternisation may also be effected in aqueous medium, e.g. in aqueous suspension, or in glacial acetic acid. It is advantageous to effect the quaternisation at elevated temperature, e.g. in the range from 30° to 200° C., in particular from 80° to 150° C., if appropriate with the addition of an acid acceptor such as an inorganic base, e.g. magnesium oxide, magnesium carbonate, sodium carbonate, calcium carbonate or sodium bicarbonate, under pressure or at normal pressure. The most favourable conditions can in each case easily be determined by routine experimentation.

Quaternisation is effected by known quaternising agents R-X' which introduce the radical R and whose radical X' is converted into the anion $X^\ominus$. Typical examples of quaternising agents R-X' are: alkyl halides, haloacetamides, β-halopropionitriles, halohydrines, alkylene oxides, alkyl esters of sulfuric acid or alkyl esters of organic sulfonic acids, for example methyl chloride, methyl bromide or methyl iodide, ethyl chloride, ethyl bromide or ethyl iodide, propyl bromide or propyl iodide, butyl bromide, benzyl chloride or benzyl bromide, chloroacetamide, β-chloropropionitrile, ethylene chlorohydrin, dimethyl sulfate, diethyl sulfate, dibutyl sulfate, methyl benzenesulfonate, methyl, ethyl, propyl or butyl p-toluenesulfonate, n-propyl, isopropyl, n-butyl, sec-butyl and tert-butyl benzenesulfonate, allyl chloride or allyl bromide, methallyl chloride or methallyl bromide, trimethyloxonium borofluoride, 1,4-dichloroprop-2-ene, 1-chlorobut-2-ene, 1,2-dichloroprop-2-ene, 1-chloro-2-vinylprop-2-ene, 1-chloropenta-2,4-diene, as well as acrylonitrile, acrylic acid, acrylamide, methyl acrylate, ethylene oxide and propylene oxide.

Thus the radical X' is e.g. halogen (preferably chlorine, bromine or iodine), alkyl $-S_4^\ominus$

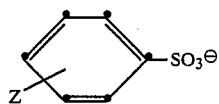

(Z=hydrogen, halogen, methyl).

After the quaternisation, the novel compounds of formula (1) can be isolated from the reaction medium and dried or used direct as solution. If desired or necessary (e.g. for reasons of solubility), it is possible to replace the anion $X^\ominus$ by another anion in known manner.

The novel cationic 1,2,3-thiadizole-azo compounds of formula (1) are used as dyes for dyeing and, with the addition of binding agents and solvents, for printing materials which can be dyed with cationic dyes, in particular textile fibre materials. These materials consist e.g. of homopolymers or copolymers of acrylonitrile (polyacrylonitrile) or synthetic polyamides or polyesters which are modified by acid groups. In addition, the novel cationic azo compounds are also used for dyeing gel fibres, plastics materials preferably consisting of the polymers indicated above, as well as tanned cellulosic materials, leathers and paper and in particular for blended fabrics of polyacrylonitrile and wool. The use of the azo compounds of the invention and a process for dyeing or printing the above-mentioned materials, which comprises applying to or incorporating one or more of the compounds of formula (1) in said materials likewise constitute objects of the present invention, as does the dyed material obtained by this dyeing process.

The cationic dyes of the general formula (1) are particularly suitable for dyeing flocks, fibres, filaments, ribbons, wovens or knits made of polyacrylonitrile or of copolymers of acrylonitrile with other vinyl compounds such as viny chloride, vinylidene chloride, vinyl fluoride, vinyl acetate, vinyl pyridine, vinyl imidazole, vinyl alcohol, acrylates, methacrylates, acrylamides, methacrylamides and asymmetric dicyanoethylene, which copolymers contain at least 85% of acrylonitrile. Flocks, fibres, filaments, ribbons, wovens or knits made of acid modified synthetic materials, in particular acid modified aromatic polyesters and acid modified polyamide fibres can also be dyed. Examples of acid modified aromatic polyesters are the polycondensation products of sulfoterephthalic acid and ethylene glycol, i.e. polyethylene glycol terephthalates which contain sulfonic acid groups.

Dyeing is preferably carried out in aqueous neutral or acid medium by the exhaust process, under pressure or under normal pressure, or by the continuous process. In the dyeing process, the material to be dyed is e.g. put into the dye bath at a temperature in the range from about 40° to 60° C. and then dyed at boiling point. It is also possible to carry out dyeing under pressure at a temperature above 100° C., e.g. in the range from 110° to 130° C., in a pressure dyeing apparatus. The textile material to be dyed may be in a wide range of presentation, e.g. in the form of fibres, filaments, wovens, knits, piece goods or finished articles.

When applied to the above-mentioned materials, the compounds of formula (1) give mostly blue dyeings or prints which have very good properties, in particular high pH stability and fastness to steam, rubbing and sublimation very good uptake and excellent light-fastness. Especially the dyes of formula (1) having a low molecular weight exhibit excellent migration properties and thus yield level dyeings.

The novel compounds of formula (1) can be used as dyes for the above described utilities as single compounds or also in mixtures which contain at least two compounds of formula (1).

The invention is further illustrated by the following Examples, in which parts and percentages are by weight unless otherwise stated. Melting points are uncorrected.

EXAMPLE 1

10.0 parts of 5-amino-1,2,3-thiadiazole and 12.1 parts of N,N-dimethylaniline are dissolved in 150 parts by volume of water and 15 parts by volume of 30% hydrochloric acid. The solution is cooled to −5° C., then 50 parts by volume of 2N sodium nitrite solution are slowly added dropwise with stirring. A reddish brown precipitate forms. The batch is stirred for 3 hours at −5° to 0° C., the precipitate is then isolated by filtration, washed free of salt and acid with water and dried, affording 15.0 g of the compound of formula

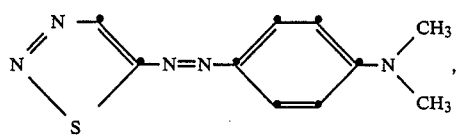
(3)

11.65 parts of this compound are dissolved at 100°–110° C. in 100 parts by volume of dimethylformamide. Then 18.9 parts of dimethyl sulfate are added dropwise over 1 hour and the reaction mixture is stirred for a further 4 hours at this temperature. Quaternisation is then complete. The solvent is distilled off under reduced pressure and the residual oil is dissolved in 250 parts by volume of water. The solution is filtered and the product is salted out with 50 parts of NaCl and 25 parts of zinc chloride. The precipitate is filtered with suction, washed with a small quantity of saturated NaCl solution, washed and dried, affording 14 g of the compound of formula

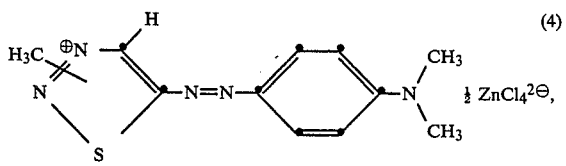
(4)

which dyes polyacrylonitrile in a lightfast neutral blue shade.

EXAMPLE 2

The procedure of Example 1 is repeated, replacing N,N-dimethylaniline by the equivalent amount of N,N-diethylaniline. The resultant compound of formula

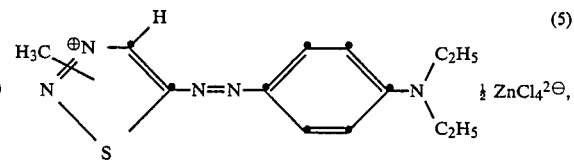
(5)

which dyes polyacrylonitrile in a lightfast neutral blue shade.

EXAMPLE 3

The procedure of Example 1 is repeated, replacing N,N-dimethylaniline by the equivalent amount of 1,2,2,4-tetramethyl-1,2,3,4-tetrahydroquinoline. The resultant compound of formula

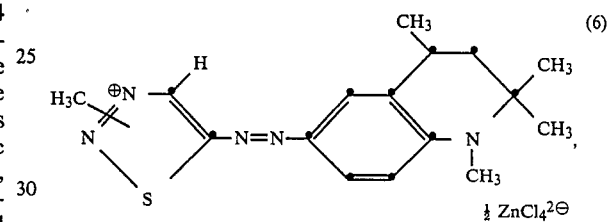
(6)

which dyes polyacrylonitrile in a lightfast greenish blue shade.

EXAMPLES 4–16

Further dyes of the general formula

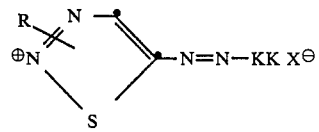

which can be prepared in a manner analogous to that described in Example 1 are listed in the following table.

| Ex. | R | KK | X$^\ominus$ | Shade on polyacrylonitrile |
|---|---|---|---|---|
| 4 | CH$_3$ | ![phenyl with CH$_3$, CH$_3$, CH$_3$] | Cl$^\ominus$ | greenish blue |
| 5 | CH$_3$ | ![phenyl with C$_3$H$_7$, C$_3$H$_7$, CH$_3$] | Cl$^\ominus$ | greenish blue |

-continued

| Ex. | R | KK | $X^\ominus$ | Shade on polyacrylonitrile |
|---|---|---|---|---|
| 6 | $CH_2CH_2OH$ | 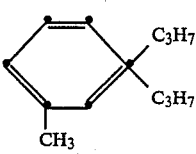 | $\frac{1}{2} ZnCl_4^{2\ominus}$ | greenish blue |
| 7 | $CH_3$ | 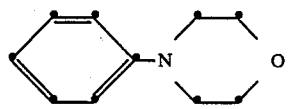 | $\frac{1}{2} ZnCl_4^{2\ominus}$ | reddish blue |
| 8 | $CH_3$ | 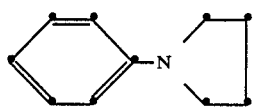 | $\frac{1}{2} ZnCl_4^{2\ominus}$ | blue |
| 9 | $CH_3$ | 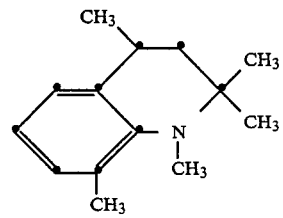 | $Cl^\ominus$ | greenish blue |
| 10 | $CH_2CH_2OH$ | 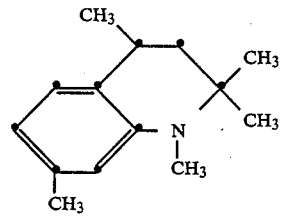 | $\frac{1}{2} ZnCl_4^{2\ominus}$ | greenish blue |
| 11 | $CH_3$ | 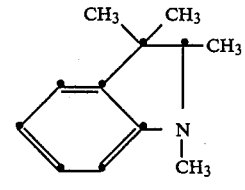 | $Cl^\ominus$ | greenish blue |
| 12 | $CH_3$ | 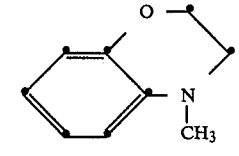 | $\frac{1}{2} ZnCl_4^{2\ominus}$ | greenish blue |
| 13 | $CH_3$ | 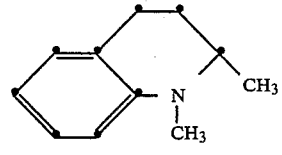 | $\frac{1}{2} ZnCl_4^{2\ominus}$ | greenish blue |
| 14 | $CH_3$ | 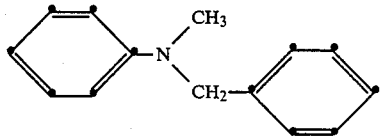 | $Cl^\ominus$ | greenish blue |

-continued

| Ex. | R | KK | $X^\ominus$ | Shade on polyacrylonitrile |
|---|---|---|---|---|
| 15 | $CH_3$ | phenyl-N(CH₃)-phenyl | $Cl^\ominus$ | greenish blue |
| 16 | $CH_3-CH(OH)-CH_3$ | phenyl-N(CH₃)-phenyl | $\frac{1}{2}ZnCl_4^{2\ominus}$ | greenish blue |
| 17 | $CH_3$ | phenyl-N($CH_2CH_3$)($CH_2CH_2OCH_3$) | $Cl^\ominus$ | greenish blue |
| 18 | $CH_3$ | phenyl-N($CH_2CH_3$)($CH_2CH_2OH$) | $\frac{1}{2}ZnCl_4^{2\ominus}$ | greenish blue |
| 19 | $CH_3$ | phenyl-N($CH_2CH_3$)($CH_2CH_2OCOCH_3$) | $Cl^\ominus$ | blue |
| 20 | $CH_3$ | phenyl-N($CH_2CH_2OCH_3$)($CH_2CH_2OCH_3$) | $Cl^\ominus$ | blue |
| 21 | $CH_3$ | phenyl-N($CH_2CH_2OCOCH_3$)($CH_2CH_2OCOCH_3$) | $\frac{1}{2}ZnCl_4^{2\ominus}$ | blue |
| 22 | $CH_3$ | julolidine-like fused ring with N-CH₃ | $Cl^\ominus$ | greenish blue |
| 23 | $CH_3$ | naphthyl-NH-CH₃ | $Cl^\ominus$ | greenish blue |
| 24 | $CH_3$ | 2,6-dimethylphenyl-NHCH($CH_3$)($CH_3$) | $\frac{1}{2}ZnCl_4^{2\ominus}$ | blue |
| 25 | $CH_3$ | 2,6-dimethylphenyl-N($CH_3$)($CH_3$) | $Cl^\ominus$ | strong reddish blue |

| Ex. | R | KK | X⊖ | Shade on polyacrylonitrile |
|---|---|---|---|---|
| 26 | CH₃ | 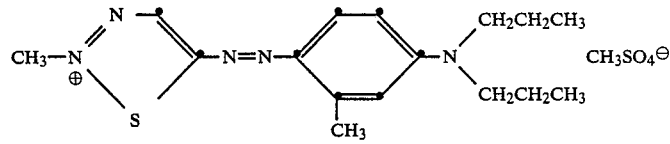 | Cl⊖ | reddish blue |

EXAMPLE 27

A polyacrylonitrile fabric is put at 60° C. into an aqueous bath (goods to liquor ratio 1:80) which contains, per liter, 0.125 of glacial acetic acid, 0.375 g of sodium acetate and 0.05 g of the compound of formula (4) (or the corresponding amount of a solid or liquid formulation of said compound). The bath is heated over 20 to 30 minutes to the boil and then kept for 90 minutes at this temperature. After rinsing, a level blue dyeing of good fastness properties is obtained.

EXAMPLE 28

An acid-modified polyester fabric is put at 20° C. into an aqueous bath (goods to liquir ratio 1:40) containing 3 g/l of sodium sulfate, 2 g/l of ammonium sulfate and 2.5 g/l of a carrier based on a nonionic dyeing assistant, and adjusted to pH 5.5 with formic acid. The bath is heated to 60° C. and 0.15 g of the compound of formula (4) (or the corresponding amount of a solid or liquid formulation of said compound) is added. The bath is heated to the boil at this temperature over about 30 minutes and kept for 60 minutes at this same temperature. The material is then rinsed and dried. A blue dyeing of good fastness properties is obtained.

EXAMPLE 29

An acid modified polyester fabric is put at 20° C. into an aqueous bath (goods to liquor ratio 1:30) which contains, per liter, 6 g of sodium sulfate, 2 g of ammonium sulfate and 0.15 g of the compound of formula (4) (or the corresponding amount of a solid or liquid formulation of said dye). The bath is adjusted with formic acid to pH 5.5. The dyeing is carried out in a closed vessel by heating over 45 minutes to 120° C. and maintaining this temperature, with shaking, for 60 minutes. After rinsing and drying, a blue dyeing of good fastness properties is obtained.

EXAMPLE 30

An acid-modified polyamide fabric is put at 20° C. into an aqueous bath (goods to liquor ratio 1:80) containing 3.6 g/l of potassium dihydrogen phosphate, 0.7 g/l of disodium phosphate and 1 g/l of a dyeing assistant, e.g. a reaction product of a phenol and excess ethylene oxide, and 0.075 g/l of the compound of formula (4) (or the corresponding amount of of a solid or liquid formulation of said compound). The bath is heated to the boil at this temperature over about 30 minutes and kept for 60 minutes at this same temperature. The material is then rinsed and dried. A blue dyeing of good fastness properties is obtained.

Blue dyeings of good fastness properties are likewise obtained by using the compound of formula (5) or (6) instead of the compound of formula (4) in Examples 17–30.

EXAMPLE 31

4 g of a polyacrylonitrile/wool staple blend containing 55% of PAC are put at about 50° C. into an AHIBA laboratory dyeing machine containing an aqueous dye liquor which contains 5% of calcined Glauber's salt, 2% of acetic acid (80%), and 1% of a commercially available antiprecipitant. After 10 minutes, 0.15% of C.I. Acid Blue 225 is added and the dyebath is subsequently heated to a temperature of 80° C. over 30 to 40 minutes. After adjusting the pH to 4–4.5, 0.1% of the dye of formula

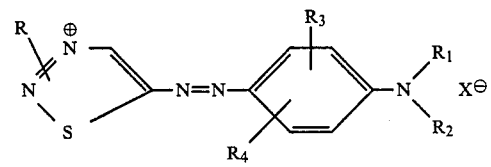

is added and the dyebath is then heated to 98°–100° C. over a further 30 to 40 minutes and kept at this temperature for 45 minutes (goods to liquor ratio 1:40). The dyebath is cooled and the fabric is rinsed. A perfect level blue dyeing is obtained.

What is claimed is:

1. A 1,2,3-thiadiazole-azo compound of the formula wherein
X⊖ is an anion
R is $C_1$–$C_4$ alkyl,
each of $R_1$ and $R_2$ independently of the other is $C_1$–$C_4$ alkyl, or $R_1$ together with $R_3$ in ortho-position to the amino group and with the benzene ring form a tetrahydroquinoline ring which is unsubstituted or substituted by 1 to 4 methyl groups,
$R_3$ is hydrogen or together with $R_1$ is the tetrahydroquinoline radical as defined above, and
$R_4$ is hydrogen.

2. A 1,2,3-thiadiazole-azo compound according to claim 1, wherein X⊖ is an anion selected from halide, boron tetrafluoride, thiocyanide, sulfate, alkylsulfate, aminosulfate, chlorate, perchlorate, carbonate, bicarbonate, phosphate, phophoromolybdate, phosphorotungstate, phosphorotungstomolybdate, benzenesulfonate, chlorobenzenesulfonate, naphthalenesulfonate, toluenesulfonate, oxalate, maleate, formate, acetate, propionate, lactate, succinate, chloroacetate, tartrate, methanesulfonate and benzoate or is a complex anion.

3. A 1,2,3-thiadiazole-azo compound according to claim 2, wherein $X^{\ominus}$ is an anion selected from halide, methyl sulfate, ethyl sulfate, phosphate, sulfate, carbonate, benzenesulfonate, toluenesulfonate, 4-chlorobenzenesulfonate, acetate, formate or tetrachlorozinc.

* * * * *